(12) United States Patent
Carty et al.

(10) Patent No.: US 9,244,444 B2
(45) Date of Patent: Jan. 26, 2016

(54) SYSTEMS AND METHODS FOR OPTIMIZING ENERGY AND RESOURCE MANAGEMENT FOR BUILDING SYSTEMS

(75) Inventors: Raphael Carty, New York, NY (US); Jeffrey T. Wenzinger, Brooklyn, NY (US)

(73) Assignee: CALLIDA ENERGY LLC, New York, NY (US)

(*) Notice: Subject to any disclaimer, the term of this patent is extended or adjusted under 35 U.S.C. 154(b) by 164 days.

(21) Appl. No.: 13/042,377

(22) Filed: Mar. 7, 2011

(65) Prior Publication Data

US 2012/0232701 A1 Sep. 13, 2012

(51) Int. Cl.
*G05B 15/02* (2006.01)

(52) U.S. Cl.
CPC ........ *G05B 15/02* (2013.01); *G05B 2219/2642* (2013.01)

(58) Field of Classification Search
USPC ....................... 700/28–33, 275–277, 286, 291
See application file for complete search history.

(56) References Cited

U.S. PATENT DOCUMENTS

| 7,065,416 B2* | 6/2006 | Weare et al. ..................... 700/94 |
| 2009/0204234 A1* | 8/2009 | Sustaeta et al. ................. 700/29 |
| 2010/0070102 A1* | 3/2010 | Benes et al. ................... 700/296 |
| 2011/0106328 A1* | 5/2011 | Zhou et al. ..................... 700/291 |
| 2012/0153725 A1* | 6/2012 | Grohman ........................ 307/39 |

OTHER PUBLICATIONS

Farhadi et al., "Effective Model for Next Day Load Curve Forecasting Based Upon Combination of Perception and Kohonen ANNs Applied to Iran Power Network", 2007 IEEE.*

* cited by examiner

*Primary Examiner* — Carlos Ortiz Rodriguez
(74) *Attorney, Agent, or Firm* — Seth H. Ostrow, Esq.; Meister Seelig & Fein LLP

(57) ABSTRACT

The method, according to one embodiment of the present invention, receives a plurality of input values associated with a building or plurality of buildings. The method then constructs a thermal and an electrical load model based on the inputs and constructs an overall energy model, the overall energy model being based on the thermal and electrical load models. The method next generates a plurality of demand models and optimizes the demand models using complex multivariate optimization techniques, wherein optimizing is based on usage data and energy rules. Finally, the method displays recommendations based on the optimized model or generating real-time, complementary control instructions based on the optimized model, the determination based on client preferences.

21 Claims, 11 Drawing Sheets

SYSTEMS AND METHODS FOR OPTIMIZING ENERGY AND RESOURCE MANAGEMENT FOR BUILDING SYSTEMS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

Embodiments of the invention described herein generally relate to optimizing the management of a building's energy and other key resources such as water, ventilation, etc. More specifically, embodiments of the present invention are directed towards systems and methods for utilizing predictive modeling to optimize a plurality of inputs representing a building's energy usage, water usage and other resource consumption.

BACKGROUND OF THE INVENTION

In the United States, buildings consume a tremendous amount of natural resources and are a major contributor to the carbon footprint and water footprint of cities. There is a great opportunity to optimize the management of energy and water while meeting the needs of the multitude of different users of commercial and industrial buildings. From EPA 2009 data, buildings account for 39% of energy used, 68% of electricity consumed and 38% CO2 emissions. Building managers face significant pressures requiring them to efficiently manage energy consumption including corporate profit pressures coupled with increasing & volatile fuel costs, corporate sustainability top-down directives mandating carbon-reporting, GHG reductions, and usage of renewable energy sources, and building regulations mandating benchmarking and improvement programs.

The need for new automation solutions to aid in the optimum use of these natural resources is significant given the uneven state of current building automation, with estimates of approximately 14% of commercial buildings having a building management system (BMS) or building automation system (BAS) in place according to Pike Research. Where BMS or BAS systems are in place, the mode of operation of building resources is typically reactive management of heating, cooling ventilation and a portion of lighting based on schedule and reacting to set-points being exceeded. There is a significant opportunity for efficiency gains through shifting to proactive management based on demand forecasts and utilizing rich real-time data on building operation and disturbances such as weather, occupancy, etc. Also, expanding the scope of proactive management from heating and cooling to a more complete integration of lighting controls and other building subsystems including a variety of technologies and strategies available for meeting customer comfort with less energy consumed.

Opportunities also exist to apply a proactive approach of predictive demand forecasts leading to optimization to additional areas such as water consumption planning/management, ensuring ventilation requirements are met (especially for areas such as labs that have more stringent or regulatory requirements) and management of ancillary plug load capacity, which may be broken out separately for the data center.

Another area of opportunity is for improved integration of the different approaches in use for energy management in a building, with facilities management often pursuing separate and sometimes conflicting strategies for energy efficiency programs to reduce base load/energy costs, demand response participation with both voluntary and mandatory commitments to utilities, use of on-site generation and storage technology, etc. Together with the increasing number of energy management approaches in place there has been an increase in different priorities for energy management: reduce overall energy costs, reduce greenhouse gas emissions/carbon impact, increase use of on-site and renewable energy resources, and generate revenue from sale of energy or participation in demand response programs. There is an opportunity for technology to give customers a way to take a holistic view of the entire envelope of energy management approaches in place and use an objective analysis to incorporate business priorities to generate an integrated energy management strategy.

Lastly there is an opportunity for the new energy management solutions envisioned to be supported by a software infrastructure that provides integration across disparate building monitoring and control systems (e.g. HVAC, lighting, plug load, etc.) and different real-time and historical data sources (e.g. weather data, rate and price data, occupancy data, peer building usage data, etc.) to enable real-time recommendations or control actions based on rich real-time data as well as planning based on predictive demand forecasts.

SUMMARY OF THE INVENTION

The method receives a plurality of input values associated with a building or plurality of buildings. In one embodiment, the method cleans the input values prior to constructing a thermal and electrical load model, wherein cleaning the input values prior to constructing a thermal and electrical load model comprises detecting abnormal data and invalid inputs. In an alternative embodiment, cleaning the input values prior to constructing a thermal and electrical load model further comprises interpolating invalid data points and performing principle component analysis of the data set. In one embodiment, the method generates and optimizes an on-site generation model for variable and consistent on-site generation sources.

The method then constructs a thermal and an electrical load model based on the inputs. In one embodiment, the thermal and electrical load models are generated based on built and stored demand models for a plurality of subsystem categories, wherein the plurality of subsystem categories includes one or more of heating/cooling, ventilation, lighting, water, plug load, and data center demand models. The method then constructs an overall energy model, the overall energy model being based on the thermal and electrical load models and generates a plurality of demand models based on the constructed energy model. In one embodiment, energy rules comprise client-defined rules/constraints, strategies and general rules and wherein the method further optimizes the models based on client-defined rules/constraints and strategies include rules for energy management specified by the building manager or owner. In an alternative embodiment, general rules include rules for optimizing building energy management include proprietary rules based on research, rules based on comparisons to peer benchmarks and rules derived by comparing research to manufacturer-supplied data.

The method then optimizes the demand models using complex multivariate optimization techniques, wherein optimizing is based on usage data and energy rules. Finally, the method displays recommendations based on the optimized model or generates real-time, complementary control instructions based on the optimized model.

The present invention is further directed towards a system for optimizing building energy usage. The system comprises a plurality of data sources containing a plurality of input values associated with a building or plurality of buildings. The system further comprises a forecasting and optimization engine operative to construct a thermal and an electrical load model based on the inputs; construct an overall energy model, the overall energy model being based on the thermal and electrical load models; and generate a plurality of demand models based on the constructed energy model.

In one embodiment, the system further comprises a data conditioner operative to clean the input values prior to constructing a thermal and electrical load model, wherein the data conditioner is operative to detect abnormal data and invalid inputs. In an alternative embodiment, the data conditioner is further operative to interpolate invalid data points and performing principle component analysis of the data set. In one embodiment, the system is further operative to generate and optimize an on-site generation model for variable and consistent on-site generation sources.

The system further comprises an optimization engine operative to optimize the demand models using complex multivariate optimization techniques, wherein optimizing is based on usage data and energy rules. In one embodiment, the forecasting and optimization engine generates the thermal and electrical load models based on built and stored demand models for a plurality of subsystem categories. In alternative embodiments, the plurality of subsystem categories includes heating/cooling, ventilation, lighting, water, plug load, and data center demand models.

The system further comprises a graphical user interface operating on a client device operative to display recommendations based on the optimized model or an interface to building control systems operative to transmit complementary control instructions based on the optimized model, the determination based on client preferences. In one embodiment, energy rules comprise client defined rules and strategies and general rules and wherein the optimizer further optimizes the models based on client defined rules and strategies include rules for energy management specified by the building manager or owner. In another embodiment, general rules include rules for optimizing building energy management include proprietary rules based on research, rules based on comparisons to peer benchmarks and rules derived by comparing research to manufacturer-supplied data.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
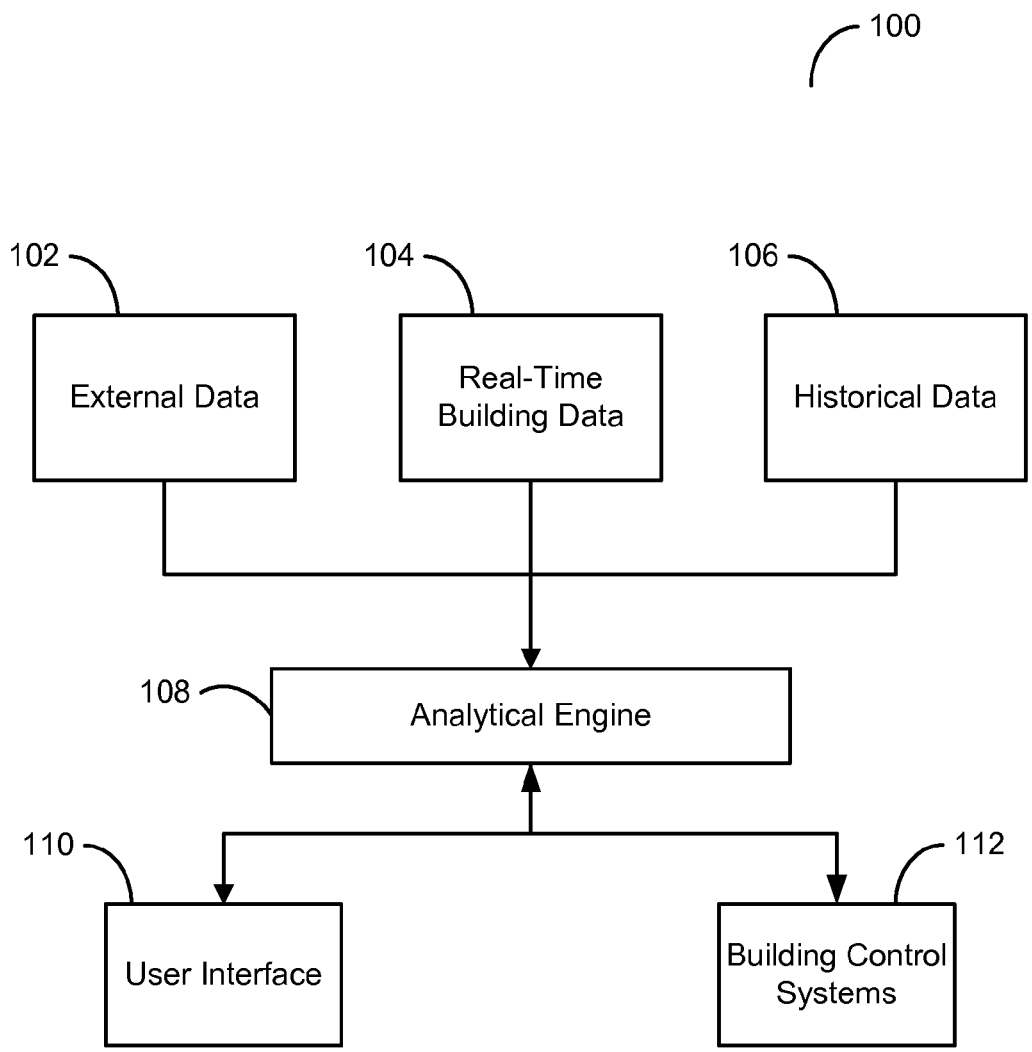
FIG. 1 presents a block diagram illustrating a system 100 for monitoring one or more building control systems according to one embodiment of the present invention.

FIG. 1 presents a block diagram illustrating a system 100 for monitoring one or more building control systems according to one embodiment of the present invention. According to the embodiment that FIG. 1 illustrates, an analytical engine 108 interacts with external data source(s) 102, real-time building data source(s) 104, and historical data source(s) 106 and transmits information to and from user interface 110 and building control systems 112. At a high level, analytical engine 108 receives a plurality of data inputs from sources 102, 104, and 106 and performs various statistical analyses on the incoming data inputs, as will be discussed further herein. In one embodiment, analytical engine 108 employs various machine-learning mechanisms to generate a predictive model based on the received data. Analytical engine 108 may further employ various optimization routines based on client-defined goals or constraints in order to optimize the generated predictive model.

User interface 110 and building control systems 112 utilize the optimized model generated by analytical engine 108. In the illustrated embodiment, user interface 110 may provide various GUI representations of data or predictions gleaned from the predictive model generated by analytical engine 108. In alternative embodiments, user interface 110 may additionally combine real-time sensor reading or other data regarding the state of a given building or campus of buildings. In the illustrated embodiment, the user interface 110 may provide an operator with data values and predictions to allow the operator to make informed decisions regarding changes in operation of building control systems 112.

In addition to user interface 110, the building control systems 112 may additionally interact with the predictive model generated by analytical engine 108. In one embodiment, the analytical engine 108 may transmit control instructions to the building control systems 112. The analytical engine 108 may transmit such instructions using various protocols or interfaces as needed for various building subsystems (e.g., HVAC, lighting, water, etc.). In one embodiment, the analytical engine 108 may transmit these instructions automatically to the systems, thus automating the building systems based on predictions formed from the generated model(s). In alternative embodiments, the system 100 may allow the building owner/manager to automatically communicate with an energy supplier regarding on-site generation capabilities via an interface such as OpenADR.

Figure 2:
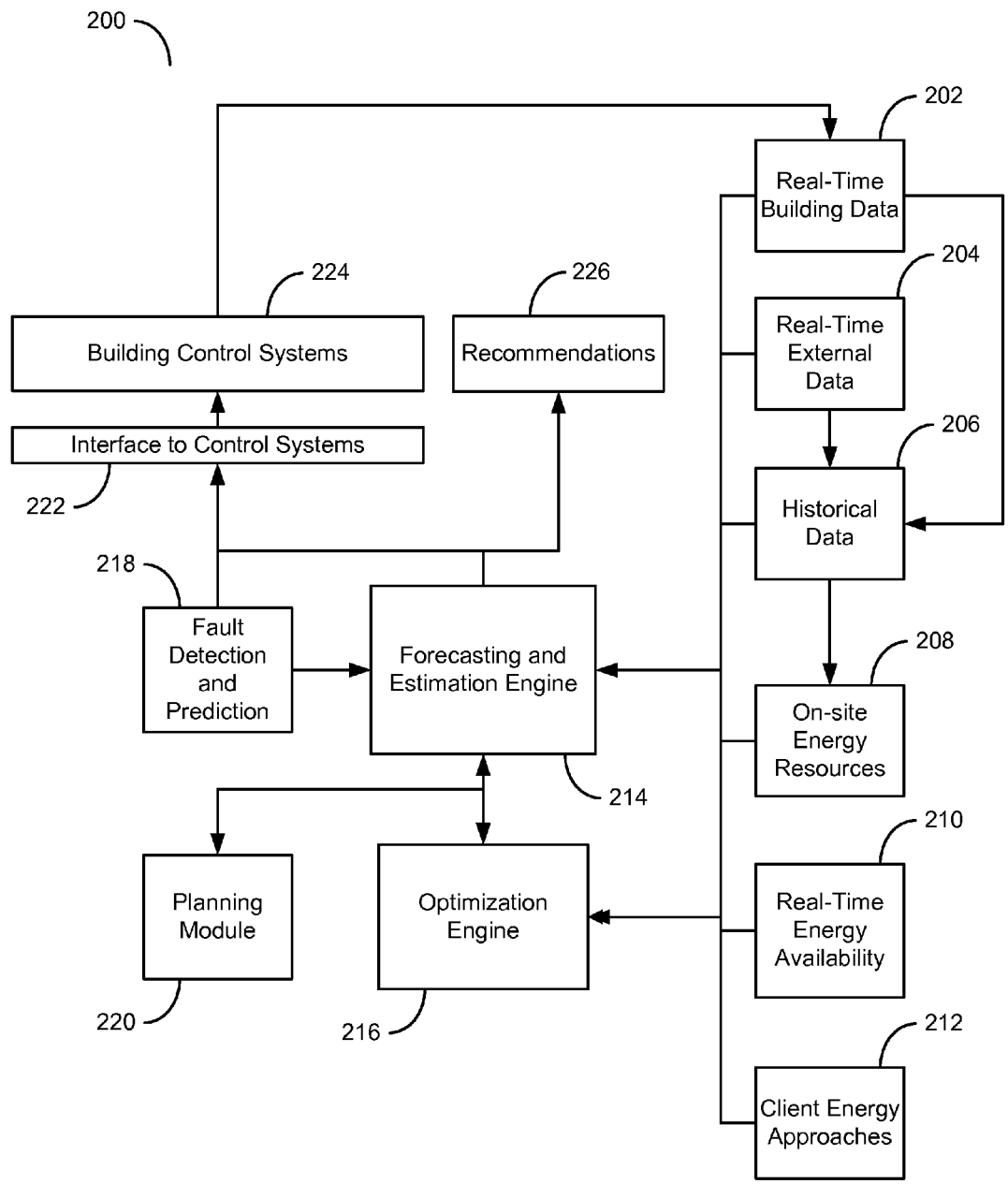
FIG. 2 presents a block diagram illustrating an analytical engine used for use in monitoring and communication with one or more building control systems to optimize the performance of building assets according to one embodiment of the present invention.

FIG. 2 presents a block diagram illustrating an analytical engine used for use in monitoring and communication with one or more building control systems to optimize the performance of building assets according to one embodiment of the present invention. In the illustrated embodiment, the analytical engine 200 includes a plurality of data stores 202-212 including real-time building data storage 202, real-time external data storage 204, historical data storage 206, on-site energy resources storage 208, real-time energy availability storage 210, and client energy approaches storage 212. Although illustrated as single storage modules, the storage modules 202-212 may comprise a plurality of components including equipment or sensors that generate data.

In the illustrated embodiment, real-time building data storage 202 stores various metrics relating to the current, or real-time, state of a given building, or campus of buildings. Real-time data may include such data such as supply air temperature data, outside air temperature data, water temperature data, heating & cooling medium (e.g., water, steam, etc.) pressure data, humidity data, air flow data, air pressure data, air quality data, $CO_2$ levels, lighting usage data, fuel or electricity consumption data, and water usage data. Real-time external data storage 204 may contain data such as environmental temperature data, solar position and irradiance data, wind speed data, and other weather data, as well as fuel oil rate data, natural gas rate data, electricity rate data, and other energy rate data. In the illustrated embodiment, the real-time external data storage 204 may receive such data from external sources. Historical data storage 206 maintains historical data previously stored in real-time building data storage 202 and real-time external data storage 204. In the illustrated embodiment, historical data storage 206 may contain various historical data regarding the building or campus including, but not limited to building zone conditions (e.g., temperature, humidity, $CO_2$), occupancy history, HVAC conditions (e.g., temperature, humidity, air flow), weather conditions (e.g., solar radiation, temperature, humidity, wind speed) and energy rates.

On-site energy resources storage 208 contains data relating to on-site energy generation (e.g., historical load profiles, system capacity limits, etc.) and on-site energy storage (e.g., historical storage profile data, system capacity limits, etc.). Real-time energy availability storage 210 contains data relating to the availability of energy such as the availability of the energy grid. Client energy approaches storage 212 may store data supplied by the client, as will be discussed further herein. Such data may comprise occupant comfort constraints, client energy management strategies (e.g., energy efficiency, demand response, demand management, renewable energy, on-site generate, and on-site storage strategies), and prioritized optimization criteria.

In the illustrated embodiment, forecasting and estimation engine 214 receives data from the data storage modules 202-212 and generates a demand model using predictive modeling, as will be discussed in more detail with respect to FIGS. 3 and 6. In one embodiment, in order to generate demand models forecasting and estimation engine 214 receives data from real-time external data storage 204, historical data 206, on-site energy resources storage 208, real-time energy availability storage 210, and client energy approaches 212. In addition to data from storage modules 202-212, forecasting and estimation engine 214 may additionally receive feedback from the optimization engine 216 in order to refine the generated demand models further. In the illustrated embodiment, forecasting and estimation engine 214 may generate a plurality of demand models for each desired subsystem (e.g., heating, cooling, lighting, ventilation, water, plug load, data center, etc.).

After the forecasting and estimation engine 214 generates the demand models, optimization engine 216 receives the models and attempts to optimize them. In the illustrated embodiment, optimization engine 216 may utilize data from client energy approaches storage 212, real-time external data storage 204, and real-time building data storage 202 in order to further refine the models. In one embodiment, the optimization engine 216 may attempt to meet targets for multiple optimization criteria simultaneously using prioritization of optimization criteria drawn from client energy approaches stored in 212. For example, a given client may indicate that after occupant comfort constraints have been met that minimizing cost is the top priority for optimization and that minimizing greenhouse gas emissions/carbon impact is the second priority. Based on this prioritization the optimization engine 216 may try to optimize the demand models in order to minimize energy costs and minimize greenhouse gas but weighting energy cost minimization over greenhouse gas emissions minimization. Further discussion of the optimization method is discussed more fully with respect to FIGS. 8A and 8B.

The system 200 further contains a fault detection and prediction module 218, which may be operative to detect faults from sensor or equipment data and also predict such faults. In the illustrated embodiment, fault detection and prediction module 218 may be operative to transmit data relating to detections and predictions to forecasting and estimation engine 214 to further refine the generated demand models, to the on-site energy resources 208 to refine information on availability of energy supply for later use in the optimization or to the building, or to the building control systems 112 to update building resource status. Fault detection and prediction is discussed more fully with respect to FIGS. 10 and 11. Additionally, the system 200 contains a planning module 220. Planning module 220 may be operative to utilize the optimized demand models in determining an optimized response to a hypothetical demand scenario. The use of demand models with respect to planning is discussed more fully with respect to FIG. 9.

After the optimization engine 216 optimizes the demand models, the analytical engine 214 is operative to receive real-time inputs and generate predictions based on the optimized demand models. For example, if the analytical engine 200 receives inputs stating that there is a change in temperature, the analytical engine 200 inputs the temperature changes into the appropriate demand model. In response, the analytical engine 200 may take a plurality of actions. In one embodiment, the analytical engine 200 may generate control instructions that may automatically adjust equipment settings and parameters. In this embodiment, the analytical engine 200 may interact directly with the building control systems 224 via an interface to the control systems 222. The interface to the control systems 222 allows the analytical engine 200 to communicate with a plurality of disparate services (e.g., HVAC, lighting, etc.). Alternatively, the analytical engine 200 may simply generate recommendations 226 and display such recommendations to an operator or building manager via a graphical user interface. In an alternative embodiment, the analytical engine 200 may utilize both automatic generation of control instructions and recommendations as determined by the building owner. In alternative embodiments, the system 200 may allow the building owner/manager to automatically communicate with an energy supplier regarding on-site generation capabilities via an interface such as OpenADR.

Figure 3:
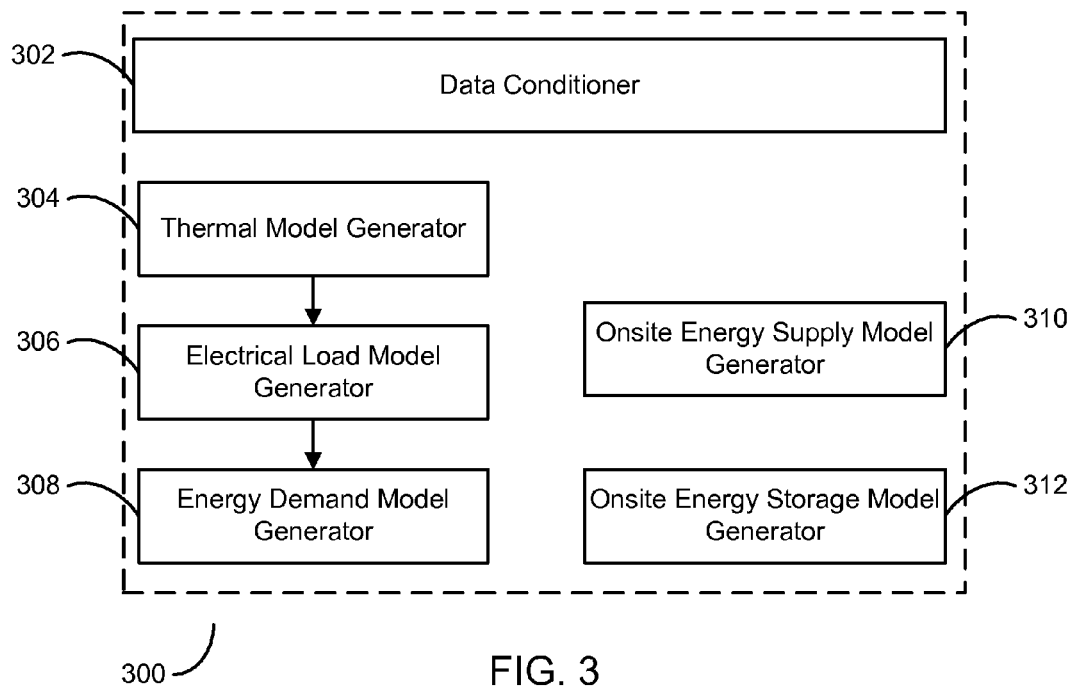
FIG. 3 presents a block diagram illustrating a forecasting and estimation engine according to one embodiment of the present invention.

FIG. 3 presents a block diagram illustrating a forecasting and estimation engine according to one embodiment of the present invention. In the illustrated embodiment, engine 300 contains a data conditioner module 302. In the illustrated embodiment, the data conditioner 302 receives input data, such as data from storage modules 202-212. This data may comprise data relating to sensor or equipment readings within a building or campus of buildings. For example, one input may comprise various lighting readings from within a specific zone (e.g., a room or group of rooms) within a building. The data conditioner 302 parses the received input data and cleans the input data. In one embodiment, cleaning the data may comprise detecting invalid or abnormal data. Methods for conditioning input data are discussed more fully with respect to FIG. 5.

After the data is conditioned, the engine 200 sends the input data to thermal model generator 304. In alternative embodiments, the engine 200 sends input data to an appropriate model generator based on the subsystem being modeled. Before generating a thermal model, the engine 300 may be operative to determine a plurality of modeling parameters for specific areas. For example, the engine 300 may select the temperature and heating and cooling system data representing heating and cooling (such as temperatures, humidity, heating or cooling load). Additionally, the engine 300 may determine modeling parameters for ventilation (such as air changes, air flow, air quality), lighting (such as illumination, electricity), water (such as total water volume, potable water volume, domestic hot water (DHW) volume, make up water volume), plug load (such as electricity), and data centers (such as electricity).

In the illustrated embodiment, thermal model generator 304 is operative to process a plurality of thermal inputs and generate a predictive model based on the inputs. A variety of techniques may be used in generating the thermal model, and other models discussed herein, including, but not limited to, memory-based time-series regression analysis using ARIMA, ANN, SVM or other regression techniques, etc. In the illustrated embodiment, the thermal model generator 304 aggregates building component data from the most granular data (e.g., specific HVAC equipment). The thermal model generator may additionally generate the model based on a granular building zone to be conditioned.

After generating the thermal model, the electrical load model generator 304 generates an electrical load model. The electrical load model comprises a predictive model generated similar to the thermal model that is, based on granular subsystem measurements. The engine 300 may then generate an energy demand model via energy demand model generator 308. In the illustrated embodiment, the demand model generator 308 may generate the energy demand model by combining the models generated by the thermal model generator 304 and electrical load model 306. In the illustrated embodiment, the demand model generator 308 analyzes the interactive effects and trade-offs between the thermal and electrical model. Although not illustrated, the engine 300 may include other model generators including, but not limited to, a ventilation model, water model, plug load model, and data center model.

In addition to the energy demand model, the on-site generation model generator 310 is operative to generate a predictive model based on a building or campuses on-site generation activities. In the illustrated embodiment, the on-site generation model is based primarily on historical on-site power generation data and real-time, historical, weather forecast data. Additionally, on-site storage model generator 312 is operative to generate a predictive storage model based on historical storage inflow/outflow data and capacity data. Methods for generating on-site generation and storage models are discussed more fully with respect to FIG. 7.

Figure 4:
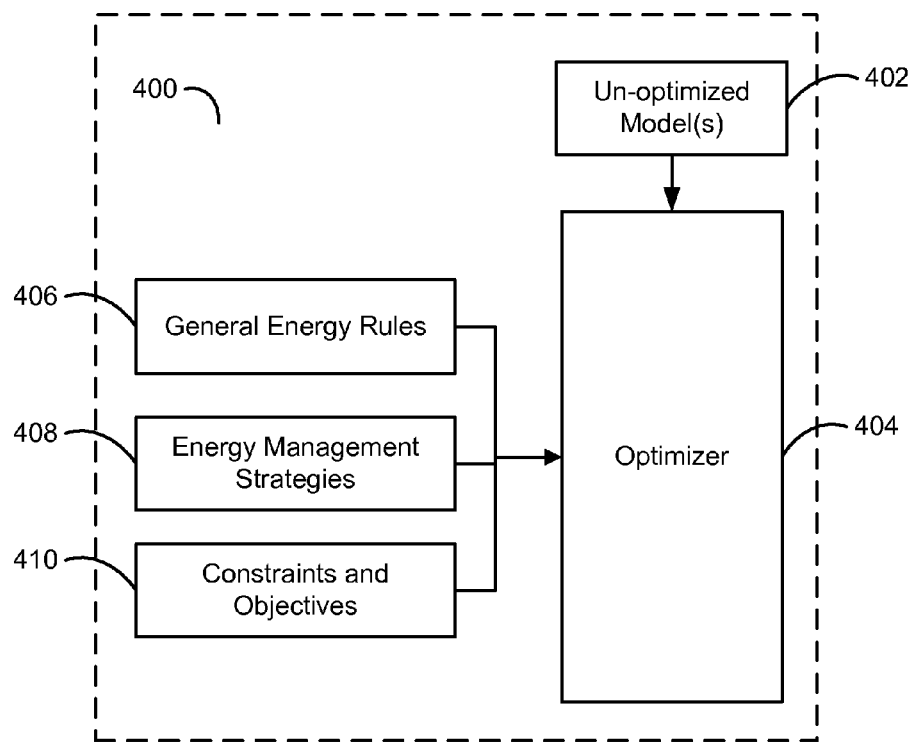
FIG. 4 presents a block diagram illustrating an optimization engine according to one embodiment of the present invention.

FIG. 4 presents a block diagram illustrating an optimization engine according to one embodiment of the present invention. According to the embodiment that FIG. 4 illustrates, an optimization engine 400 receives a plurality of un-optimized models 402 from the forecasting and estimation engine 300. These un-optimized models 402 serve as inputs to the optimizer 404. In addition, the optimizer 404 receives various constraints, strategies, and rules 406-412 that shape the optimization of the un-optimized models 402. In the illustrated embodiment, the system 400 may additionally store heuristics or statistics regarding the building or campus of building.

In the illustrated embodiment, energy management strategies 408 may comprise various strategies that the building manager or owner may wish to employ when optimizing the models. For example, the building management may wish to achieve a specified energy cost reduction. Additionally, the building management may wish to reduce greenhouse gas emissions/carbon impact by a target amount and utilize as much on-site power as percent of total power used as possible. In conjunction with energy management strategies 410, constraints and objectives 412 may additionally be specified by the building management. For example, the building management may specify various occupant comfort constraints such as temperature, humidity, and ventilation requirements. Additionally, the management may set constraint that certain thresholds for various equipment not be exceeded or a general rule such as manufacturer-supplied input may create such a constraint.

Based on the constraints, strategies, and rules 406-412, the optimizer 404 optimizes the received models 402. In the illustrated embodiment, the optimizer may use various optimization techniques including, but not limited to, nonlinear programming techniques including, but not limited to, Genetic Algorithms, Simulated Annealing, Artificial Neural Networks, or other techniques or linear approximation techniques including Tailor series expansions or artificial neural networks (ANN). The optimizer 404 may output the optimized models to a storage module (not shown) for subsequent retrieval and usage. Additionally, the optimizer 404 may output the optimized model to the forecasting and estimation engine as feedback for subsequent model generation. Further details regarding the optimization of un-optimized models are discussed further with respect to FIG. 8.

Figure 5:
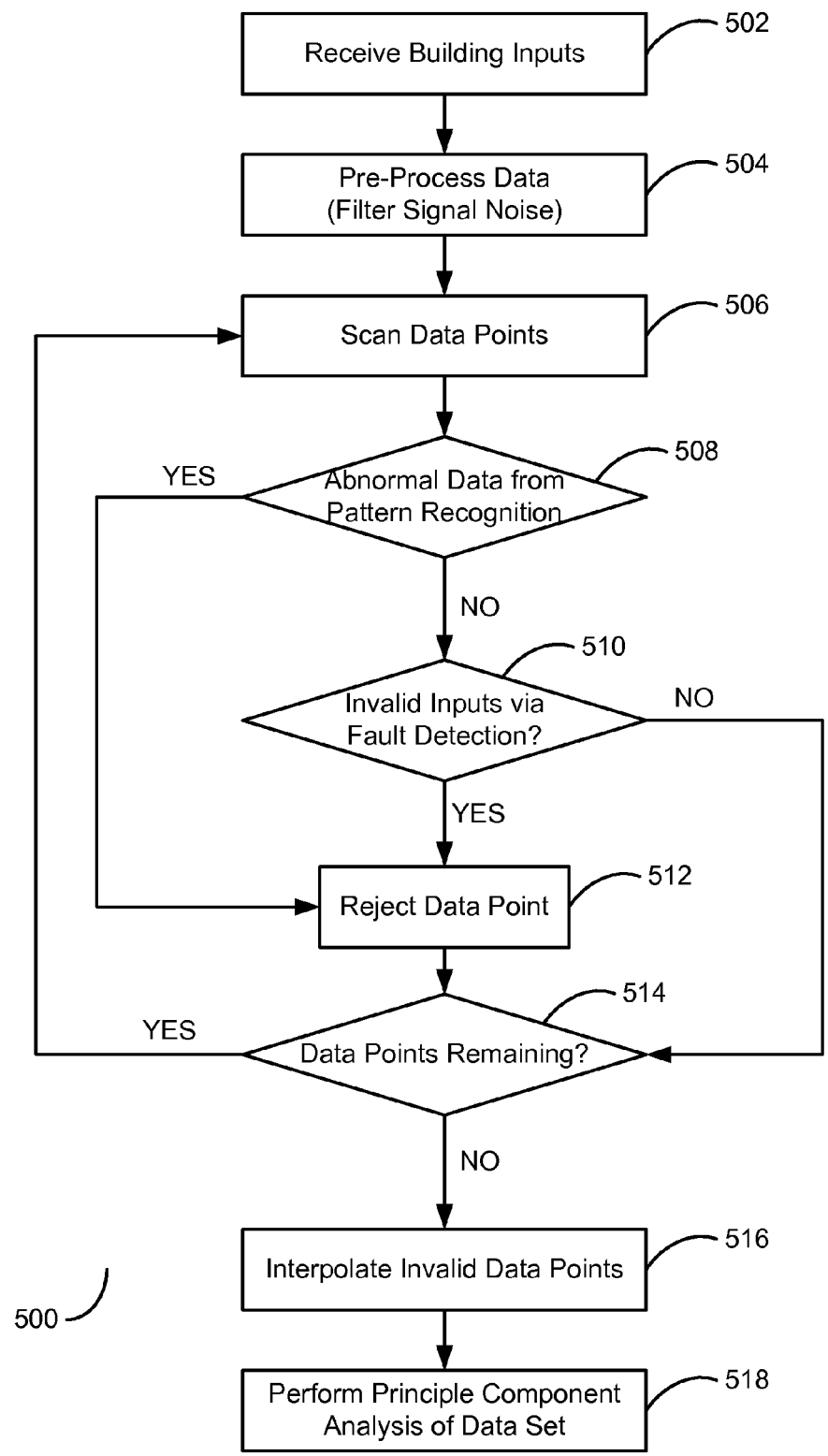
FIG. 5 presents a flow diagram illustrating a method for cleaning input data according to one embodiment of the present invention.

FIG. 5 presents a flow diagram illustrating a method for cleaning input data according to one embodiment of the present invention. According to the embodiment that FIG. 5 illustrates a method 500 receives building inputs, step 502. In one embodiment, building inputs may comprise environment and physical building characteristics (e.g., physical placement, solar placement, envelope, ventilation, number of windows, ratio of window to walls, etc.), building measurements, and disturbance in weather, occupancy, and rate/fuel price data.

The method 500 then pre-processes the input data by filtering signal noise, step 504. The method 500 then scans the remaining data points, step 506. The method 500 first determines if there is abnormal data based on pattern recognition, step 508. In the illustrated embodiment, the method 500 may employ various pattern recognition algorithms in an attempt to identify data values that differ from the normal data values expected. Next, the method 500 determines if there are any invalid input values due to faults in the sensors or building systems such as an air handling unit by employing fault detection techniques, step 510. In the illustrated embodiment, the method 500 may utilize a fault detection and prediction algorithm such as that illustrated in FIGS. 10 and 11.

If either step 508 or 510 detect anomalous data, the method will reject the data point, step 512. The method 500 then determines if there are any more data points left to be analyzed, step 514. After scanning the data points, the method 500 additionally may interpolate the value of the rejected data points based on similar data, step 516. In the illustrated embodiment, the method 500 interpolates data for abnormal/anomalous data and data from a defective device. For example, a given building zone may have a plurality of sensors monitoring temperature. If all sensors other than defective sensor report temperatures within a limited range, the method 500 may interpolate the value from the defective sensor to be in line with the correct data from the other sensors. In alternative embodiments, the method 500 may not interpolate the value of data points and may simply reject noisy data points.

After scanning the data points, rejecting anomalous data points, and interpolating data points, if desired, the method then performs principal component analysis of the data set, step 518. In performing the principal component analysis (PCA), the method 500 reduces the dimensionality to identify a feature set for the data points. In the illustrated embodiment, the method 500 may use various PCA techniques known in the art for computing the feature set.

Figure 6:
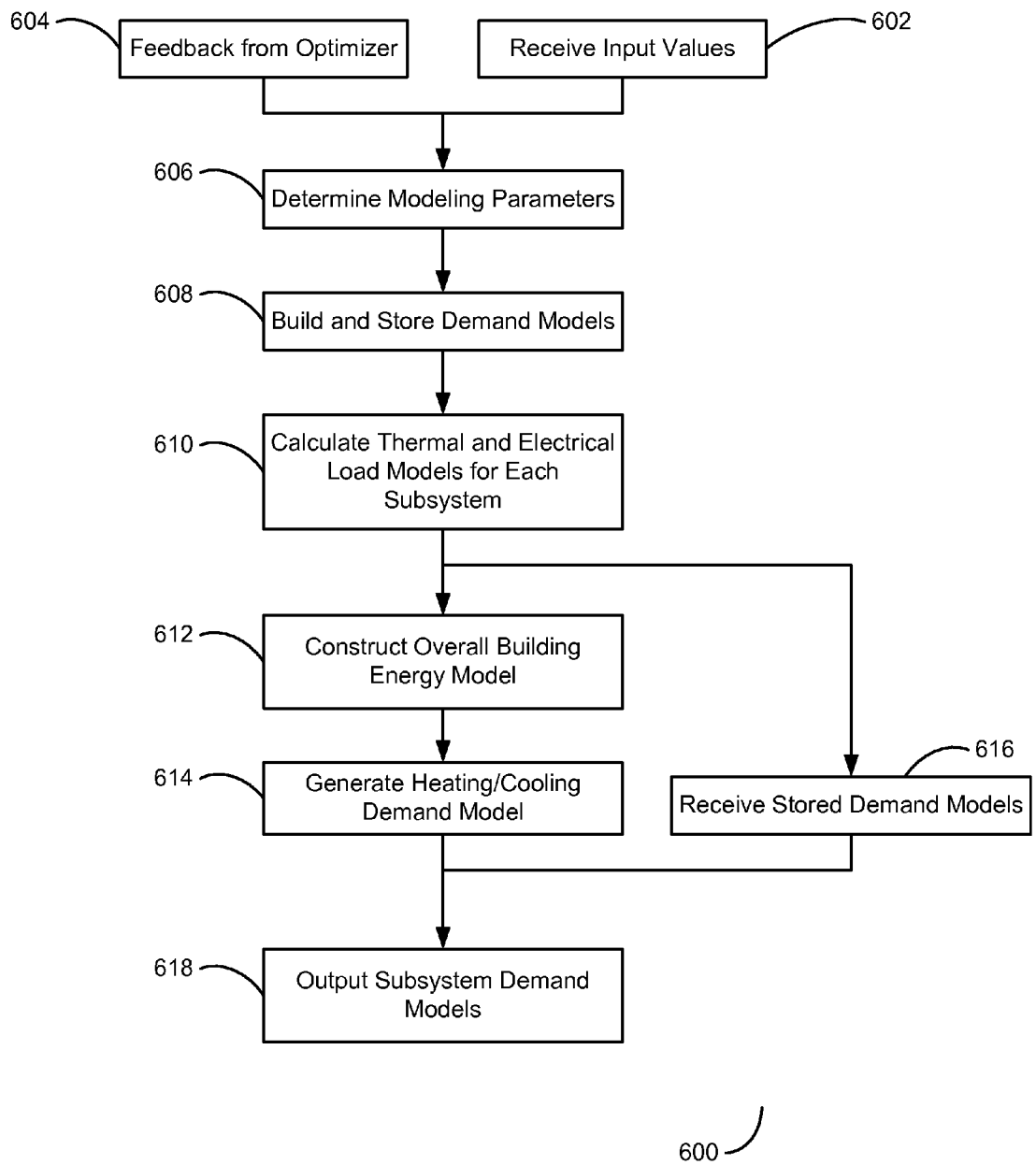
FIG. 6 presents a flow diagram illustrating a method for generating predictive building subsystem demand models according to embodiment of the present invention.

FIG. 6 presents a flow diagram illustrating a method for generating predictive building subsystem demand models according to embodiment of the present invention. According to the embodiment that FIG. 6 illustrates, a method 600 receives input values, step 602, and feedback from the optimizer, step 604. In the illustrated embodiment, input values may correspond to raw data from sensors, equipment, real-time external data, and other data sources as discussed previously. Additionally, the method 600 receives feedback from the optimizer in order to further refine the demand model forecasts based on the optimized models. The feedback from the optimizer (step 604) together with the updated input values (step 602) provide adaptive learning about the building to improve the accuracy of future demand forecast predictions.

After receiving the input and feedback, the method 600 determines modeling parameters, step 606, and builds and stores the demand models, step 608. In one embodiment of step 606, memory-based time-series regression analysis may employ analytical techniques such as ARIMA, ANN, SVM or other regression techniques to update the parameters of the demand model considering the history of the process, general energy rules (from knowledge base held in, for example, storage 408), a physical model of the subsystem (if available) and the new input values from 602. In the illustrated embodiment, the method 600 generates demand models for a plurality of discrete subsystems including, but not limited to ventilation, lighting, water, plug load, and data centers. In step 608, we use the model parameters from step 606 to forecast the demand for each subsystem (including but not limited to lighting, water, ventilation, plug load and data center) In this approach we build the demand forecast hierarchically going from the most granular to the aggregate model for each subsystem to produce the overall subsystem demand forecast for the entire building/building complex/campus. The method 600 determines the relevant parameters for each demand model. For example, the method 600 may generate parameters for heating/cooling (such as temperatures, humidity, heating or cooling load), ventilation (such as air changes, air flow, air quality), lighting (such as illumination, electricity), water (such as total water volume, potable water volume, domestic hot water (DHW) volume, make up water volume), plug load (such as electricity), and data centers (such as electricity).

Steps 610-614 illustrate a method for generating demand models for heating and cooling subsystems. The method 600 first receives the subsystem demand models from 608, then calculates a thermal model and electrical load model for each subsystem relevant to the overall energy demand model, step 610. For example, the method 600 may generate thermal and electrical load models for HVAC, ventilation, lighting, water, data center, and plug load systems as each system has an impact on the thermal and electrical load modeling. A variety of techniques may be used in generating such the thermal model, and other models discussed herein, including, but not limited to, memory-based time-series regression, ARIMA, ANN, SVM or other regression techniques. In the illustrated embodiment, after generating the thermal model based on the demand models, the method 600 updates the stored demand models for ventilation, lighting, water, plug load, and data centers based on the calculated thermal load model, step 616.

After generating the thermal and electrical load models and in addition to updating the received stored demand models, the method 600 constructs the overall building energy model based on the thermal and electrical load models, step 612. In the illustrated embodiment, constructing an overall building energy model comprises combining both the thermal and electrical load models to form a complete energy model for a given building/building complex or campus of buildings. Combining the thermal and electrical load models may be performed by a plurality of methods including, but not limited to, constructing a composite forecast using Bayesian techniques. After creating the combined, overall building energy model, the method 600 generates the heating and cooling demand model, step 614. In the illustrated example, the method 600 generates an appropriate demand model for heating and cooling systems based on the overall building energy model.

Finally, the method 600 outputs specific subsystem demand models, step 618. In the illustrated embodiment, the specific subsystem demand models are based on the demand models generated in step 614 as well as retrieved and updated stored demand models, step 616. In one embodiment, the retrieved demand models may comprise demand models for lighting, ventilation, water, data center, and plug load while the generated demand models correspond to heating and cooling demand models.

In the illustrated embodiment, the method 600 may be utilized to generate (and potentially optimize) demand forecasts for a plurality of combinations of subsystems including but not limited to heating and cooling, lighting, water, ventilation, plug load, and data center subsystems. Examples of some potential combinations include, but are not limited to: heating/cooling and light; heating/cooling, ventilation, and lighting; heating/cooling, lighting and water; heating/cooling, water; heating/cooling, ventilation, and water; heating/cooling, ventilation, lighting and water; heating/cooling, ventilation, lighting, plug load; heating/cooling, ventilation, lighting, plug load, water; water; heating/cooling, ventilation, dedicated data center EMS; all electrical demand across all building subsystems (H&C, lighting, ventilation, water, plug load, data center); heating/cooling, lighting, and plug load; heating/cooling, lighting, plug load, and water; heating/cooling, ventilation, lighting, dedicated data center EMS; heating/cooling, lighting, plug load EMS, dedicated data center EMS; or heating/cooling, ventilation, lighting, plug load EMS, dedicated data center EMS.

Figure 7:
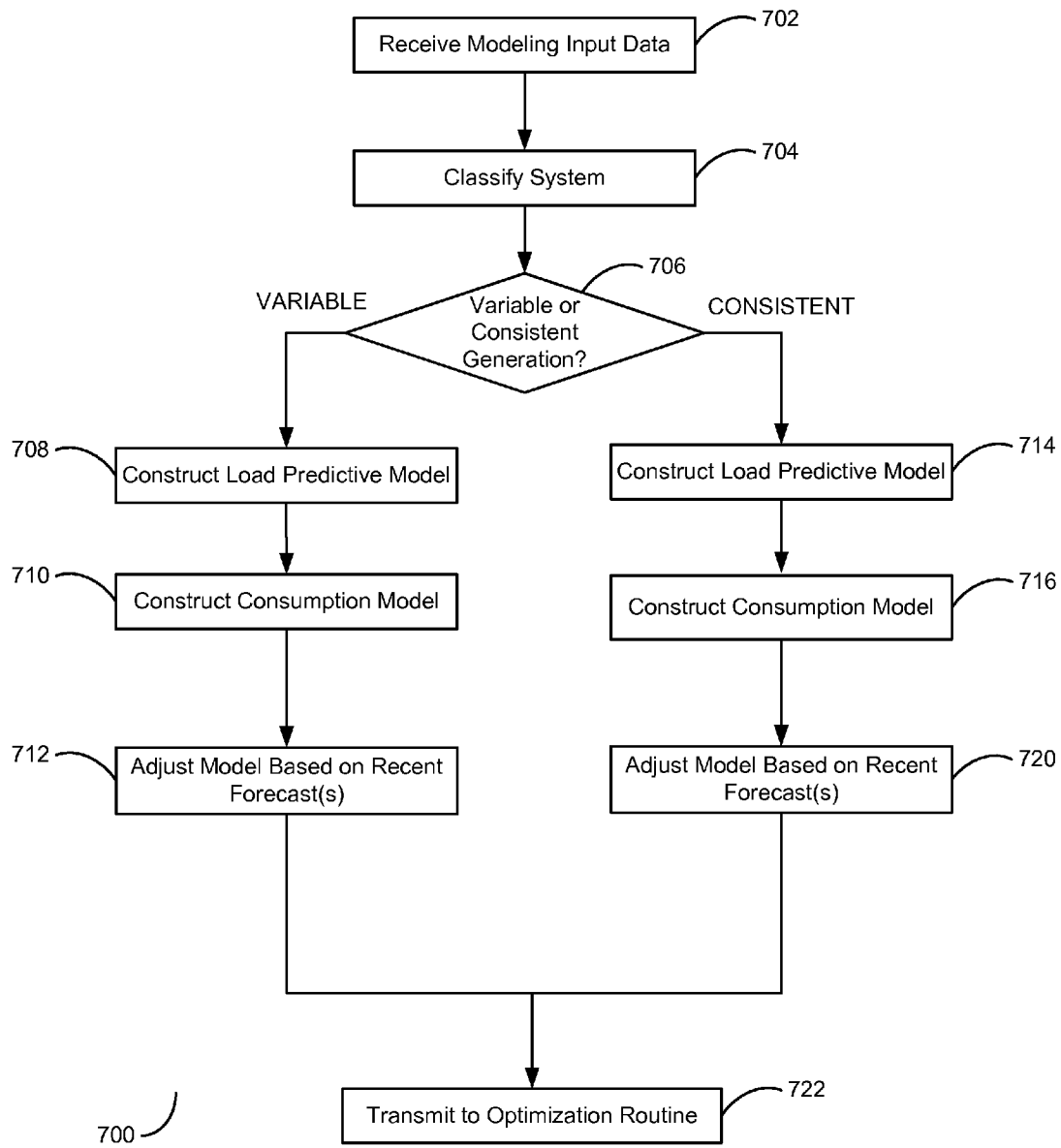
FIG. 7 presents a flow diagram illustrating a method for creating an on-site generation model according to one embodiment of the present invention.

FIG. 7 presents a flow diagram illustrating a method for creating an on-site generation model according to one embodiment of the present invention. According to the embodiment FIG. 7 illustrates, a method 700 receives modeling input data, step 702. In the illustrated embodiment, modeling input data comprises data such as historical on-site power generation data (e.g., power, time, and input fuel data), weather forecast data, sensor data, and historical weather, solar, or wind data.

After receiving the input data, the method 700 classifies the system, step 704. In the illustrated embodiment, the method 700 classifies the system as variable or consistent generation based on the received inputs. In the illustrated embodiment, classification of the system comprises the classification of the reliability, delivery, and presence of an input energy source. In the illustrated embodiment, variable or consistent refers to the level of control an operator has on the input energy source of a system. For example, for weather-dependent systems (e.g., solar, wind, etc.), there is little control or consistency over the input energy source, thus the system may be considered variable. However, input energy is often available in regular cycles and can be predicted and planned for. In contrast, generators that rely on a reliable fuel source or energy grid are considered consistent.

The method 700 then inspects the classification, step 706. If the method 700 classifies the on-site generation as variable the method 700 constructs a load predictive model, step 708, and a consumption model, step 710. In the illustrated embodiment, constructing a load predictive model may employ various stochastic modeling techniques to model the received inputs into a load prediction model. Additionally, various modeling techniques described previously may be used in constructing the consumption and load predictive models. In the illustrated embodiment, the method 700 may combine the two models by discounting the consumption model from the prediction model. After generating the models, the method 700 adjusts the models based on recent forecasts, step 712. In the illustrated embodiment, adjusting the model on recent forecasts may update the model based on the most recent forecast, thus tuning the model to weight recent forecasts heavier than older, historical forecasts.

If the method 700 determines that the on-site generation is consistent, the method 700 constructs the load predictive model, step 714. In the illustrated embodiment, construction of the load predictive model may be accomplished by similar means as the predictive model generated for variable on-site generation sources. The method 700 then adjusts the model based on recent forecasts, step 716, in a manner previous described with respect to variable on-site generation. The method 700 then creates a consumption model, step 720, in a manner similar to that of variable on-site generation sources. After the models are created as discussed above, the method 700 transmits the models to an optimization routine, step 722. In the illustrated embodiment, the model(s) may later be optimized according to a pre-defined optimization technique, as will be discussed with respect to FIGS. 8A and 8B.

Figure 8A:
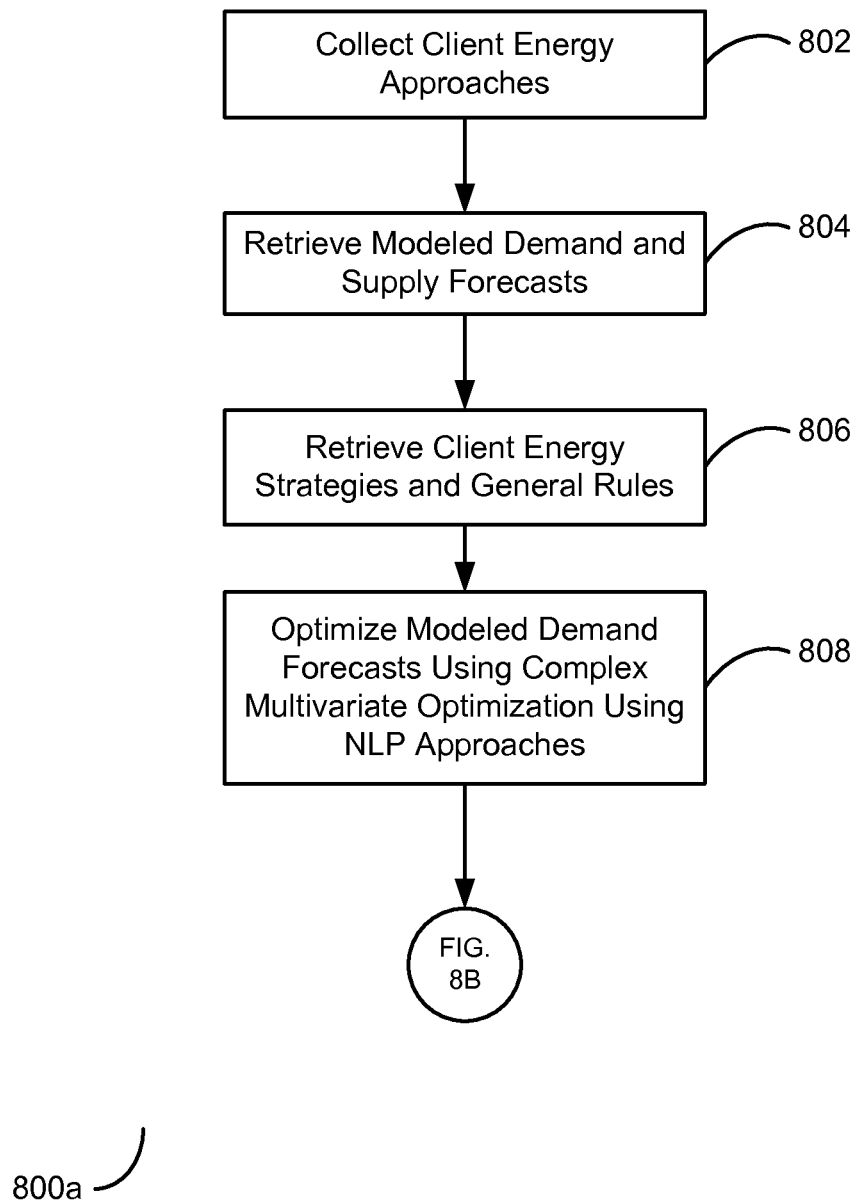
FIGS. 8A and 8B present a method for optimizing a demand model according to one embodiment of the present invention.
Figure 8B:
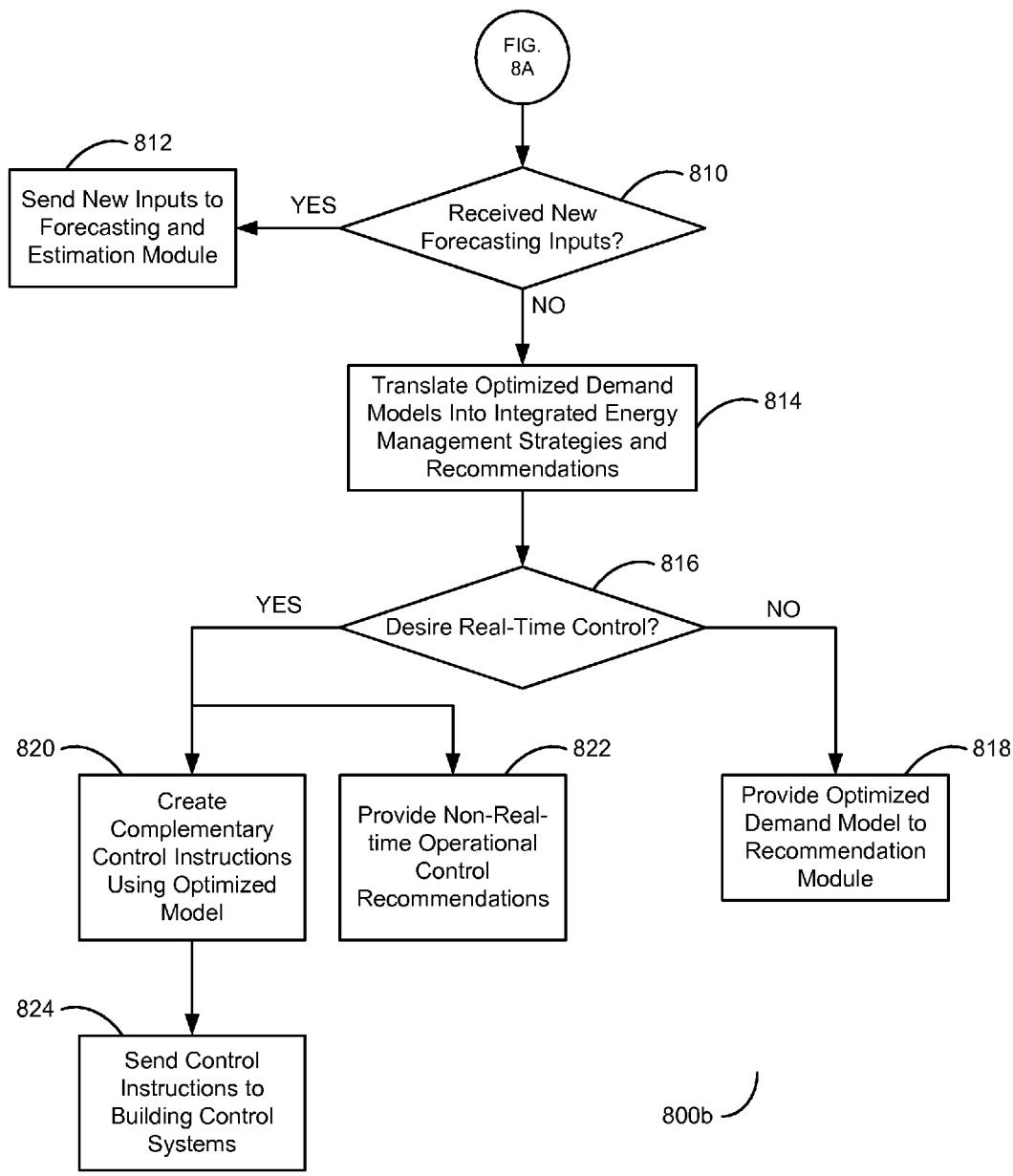

FIGS. 8A and 8B present a method for optimizing a demand model according to one embodiment of the present invention. According to the embodiment that FIG. 8A illustrates, a method 800a collects client energy approaches, step 802. In the illustrated embodiment, client usage data may comprise occupant comfort constraints such as temperature, humidity, air quality, and illumination required.

The method 800a then retrieves the modeled demand forecasts, step 804. In the illustrated embodiment, the modeled demand forecasts are the output of the forecasting and estimation engine as discussed previously. In the illustrated embodiment, the method 800 may retrieve demand forecasts for physical resources including energy (electricity and fuels), ventilation air, and water and the current state of the building or campus including subsystem demands including the heating demand, cooling demand, ventilation demand, lighting demand, water demand, data center demand and plug load demand.

The method 800a additionally retrieves existing client energy strategies and general rules, step 806. In the illustrated embodiment, the method 800a may retrieve client energy efficiency strategies and targets that may be expressed in a variety of ways including the overall energy cost-savings target, the targeted reduction in electricity used in kWh, the targeted reduction in the amount of fuel oil used in gallons or MMBTU, and the targeted reduction in the amount of natural gas in therms or MMBTU. Additionally, the method may retrieve a client's demand response program, or similar contract-based programs, participation goals that may be expressed in a variety of ways such as including the number of kilowatts or kilowatt hours curtailed and whether such curtailments are mandatory or voluntary and, if available, the resources in sequence to be used to meet curtailment targets. Additionally, the method may retrieve a client's demand management requirements that may be expressed in a variety of ways such as including the percent reduction in electricity usage in kilowatt hours during peak demand periods the kilowatts or percent reduction in maximum power demand in kilowatt during a billing cycle, and the resources in sequence to be used to meet curtailment targets.

Additionally, the method may retrieve a client's renewable energy usage targets including the percentage of total energy usage from renewable energy and the percentage of overall energy usage from on-site renewable energy. Additionally, the method may retrieve the client's amount of greenhouse gas emissions, such as measured in $CO_2E$ tons, as a reduction target for the building. Additionally, the method may retrieve general rules for optimizing building energy management include proprietary rules based on research, rules based on comparisons to peer benchmarks and rules derived by comparing research to manufacturer-supplied data.

The method 800a then optimizes the modeled demand forecasts using complex multivariate optimization using NLP approaches, step 808. In the illustrated embodiment, the method 800a optimizes the received, modeled demand forecasts based on the previously described constraints and priorities. In the illustrated embodiment, the method 800a may use various optimization techniques including, but not limited to, non-linear programming techniques including genetic algorithms, simulated annealing, artificial neural networks, or other techniques or linear approximation techniques including Tailor series expansions or artificial neural networks. Taking into account user inputs, optimization of the modeled demand forecasts may be performed based on a user defined prioritization of optimization criteria. In one embodiment, the nonlinear programming techniques employed may attempt to find a solution space/set that satisfies all criteria simultaneously by weighting each optimization criterion according to user-defined prioritization. In another embodiment, selection and weighting of optimization criteria may be sourced from general energy rules. Optimization criteria may include but are not limited to cost minimization (e.g., net of demand response revenue), greenhouse gas emissions/carbon impact minimization, maximization of on-site renewable energy used as a percent of total energy used, maximization of revenue from on-site generated energy, minimization of energy/fuel used and various occupant comfort criteria, which may also be set as constraints. In an embodiment, some of the general business rules received in 408 may be used as constraints in the optimization. System-specific heuristics developed through learning from the building system received from studied systems may also be used to tune the optimization algorithm.

According to the embodiment that FIG. 8B illustrates, a method 800b receives the optimized model demand forecasts from FIG. 8A and determines whether or not new forecasting inputs have been received, step 802. In the illustrated embodiment, new forecasting inputs may correspond to the category of input values utilized by the forecasting and estimation engine. If the method 800b determines that new forecasting inputs have been received, the method 800b sends these data values to the forecasting and estimation model, step 804. In the illustrated embodiment, sending these data values to the forecasting and estimation model allows the method to continually adjust the demand forecasts based on received events. In the illustrated embodiment, when the method 800b receives new forecasting inputs method 600 may be re-executed to the new, incoming inputs. In alternative embodiments, the method 800b may reforecast for each new input. In alternative embodiments, the method 800b may only reforecast for incoming data at predefined intervals or based on other criteria in order to reduce the amount of processing performed by the method 600.

If the method 800b does not receive new forecasting inputs, the method 800b translates the optimized demand models into an integrated energy management strategy and recommendations, step 806. In one embodiment, an integrated energy management strategy may include recommendations for the operation of target systems including set-points and schedules, maintenance activities to restore building systems to peak functionality, and programs to participate in (e.g., demand response or similar contract-based programs). In the illustrated embodiment, the integrated energy management strategy and recommendations may additionally be based on current conditions such that the integrated energy management strategy and recommendations allow the building or campus of building to take an optimized course of action based on client optimization priorities.

If the method 800b determines that the client desires real-time control, step 808, the method 800b creates complementary control instructions for target building systems using the optimized model, step 812, and provides non-real-time control recommendations, step 814. In alternative embodiments, the method 800b may allow the building owner/manager to automatically communicate with an energy supplier for a variety of potential purposes including but not limited to participation in demand response programs (potentially through an interface such as OpenADR), communication with smart grid monitoring including power demand profile, on-site electricity generation capacity and amount of electricity for sale to the grid or community.

In the illustrated embodiment, the method 800b may generate complementary control instructions specific to each building or campus subsystem such that the method 800b may allow for real-time control of each subsystem. Additionally, the method 800b may provide non-real-time recommendations to a building operator. For example, the method 800b may provide recommendations to a GUI display or similar mechanism that enables an operator to view the recommendations and take appropriate action. In addition to generating complementary control instructions, the method 800b sends the control instructions to the building control systems, step 816. In the illustrated embodiment, sending control instructions to the building control systems may comprise transmitting the control instructions through interfaces such as BACnet, Modbus, and LonWorks, for example, and interfacing to proprietary architectures in areas for which no standards exist.

If the method 800b determines that the client does not desire real-time control, the method 800b may simply provide the optimized demand model to a recommendation module, step 810. For example, the method 800b may provide recommendations to a GUI display or similar mechanism that enables an operator to view the recommendations and take appropriate action.

Figure 9:
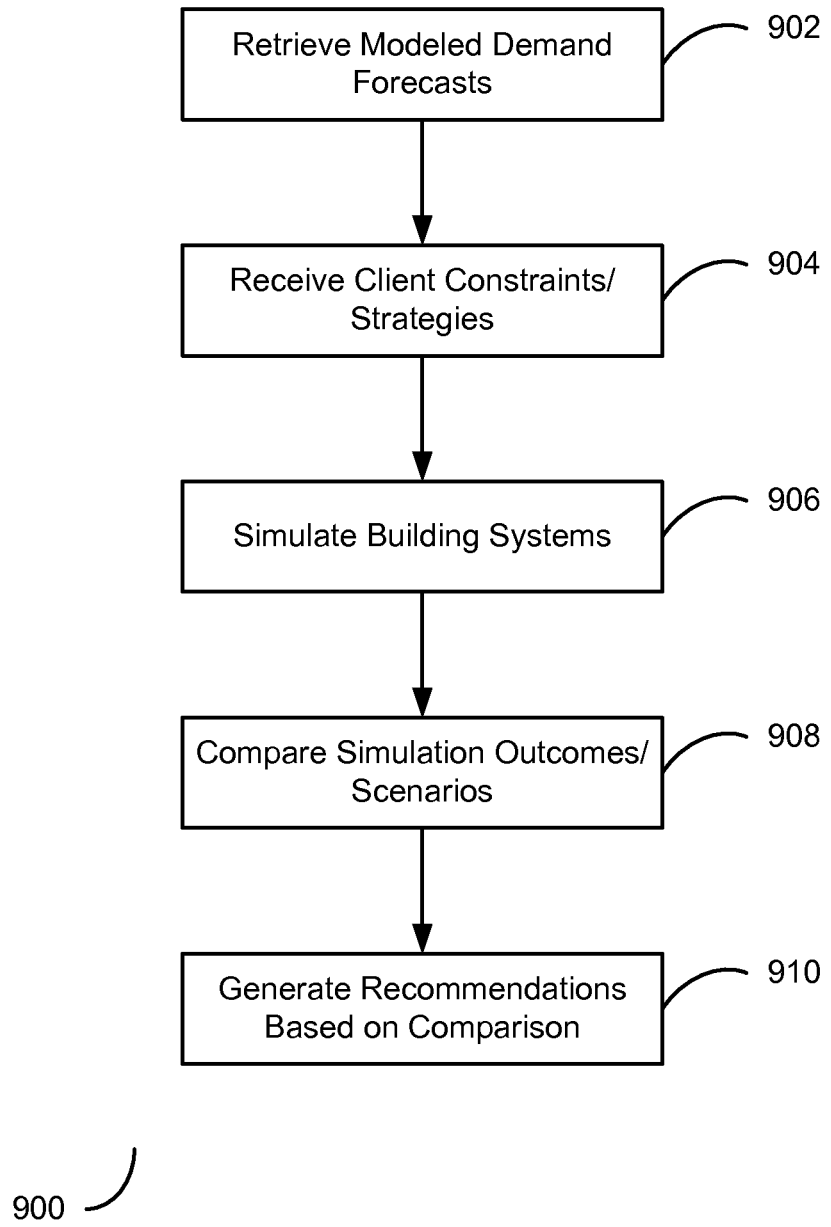
FIG. 9 presents a flow diagram illustrating a method for generating recommendations based on simulated scenarios according to one embodiment of the present invention.

FIG. 9 presents a flow diagram illustrating a method for generating recommendations based on simulated scenarios according to one embodiment of the present invention. According to the embodiment FIG. 9 illustrates, a method 900 retrieves modeled demand forecasts, step 902, and receives client constraint strategies, step 904. Retrieval of modeled demand forecasts and client constraint strategies are discussed previously and are not repeated here for the sake of clarity.

After receiving the modeled demand forecasts and client constraints/strategies, the method 900 simulates the building systems, step 906. In the illustrated embodiment, simulating the building systems may comprise varying specific parameters based on the type of simulation suggested and utilizing the demand forecasts to make predictions regarding the outcomes of such changes in variables. The method 900, after performing the simulation, compares the simulation outcomes, step 908, and generates recommendations based on the comparison, step 910.

A particular client may utilize the method 900 for various planning strategies. For example, facilities management may enter into demand response contracts with a more precise estimate of the demand response opportunity and level of commitment that is feasible for their facility versus estimating based sole on past usage (often from utility bills). In another example, facilities management may more precisely plan the required fuel needed for purchasing fixed fuel contracts in advance of the season needed to minimize costs. The predictive demand forecasts will give the facilities management better information to purchase as close as possible to the needed amount of fuel thereby minimizing over purchase and minimizing under purchase that would require more expensive "spot" purchases.

Facilities management may use predictive demand forecasts of water usage and pattern analysis to predict water usage and plan alternative strategies to minimize water usage contributing to a lower water footprint. Although this may reduce energy cost, energy consumption and GHG emissions/carbon footprint as well, the primary objective of such a planning effort is the reduction of water usage. Additionally, based on pattern recognition in the forecasting and estimation engine, new set-points can be proposed and facilities management/capital planning will be given the capability of doing a simple, "what if" analysis modeling alternate energy usage strategies for the different considered set-point options. In an alternative embodiment, facilities management will be able to evaluate the cost/benefit of potential capital improvements such as new lighting system, new boiler/chiller, new on-site generation/storage technologies, etc. based on predictive demand forecasts and simulation of alternative scenarios.

Figure 10:
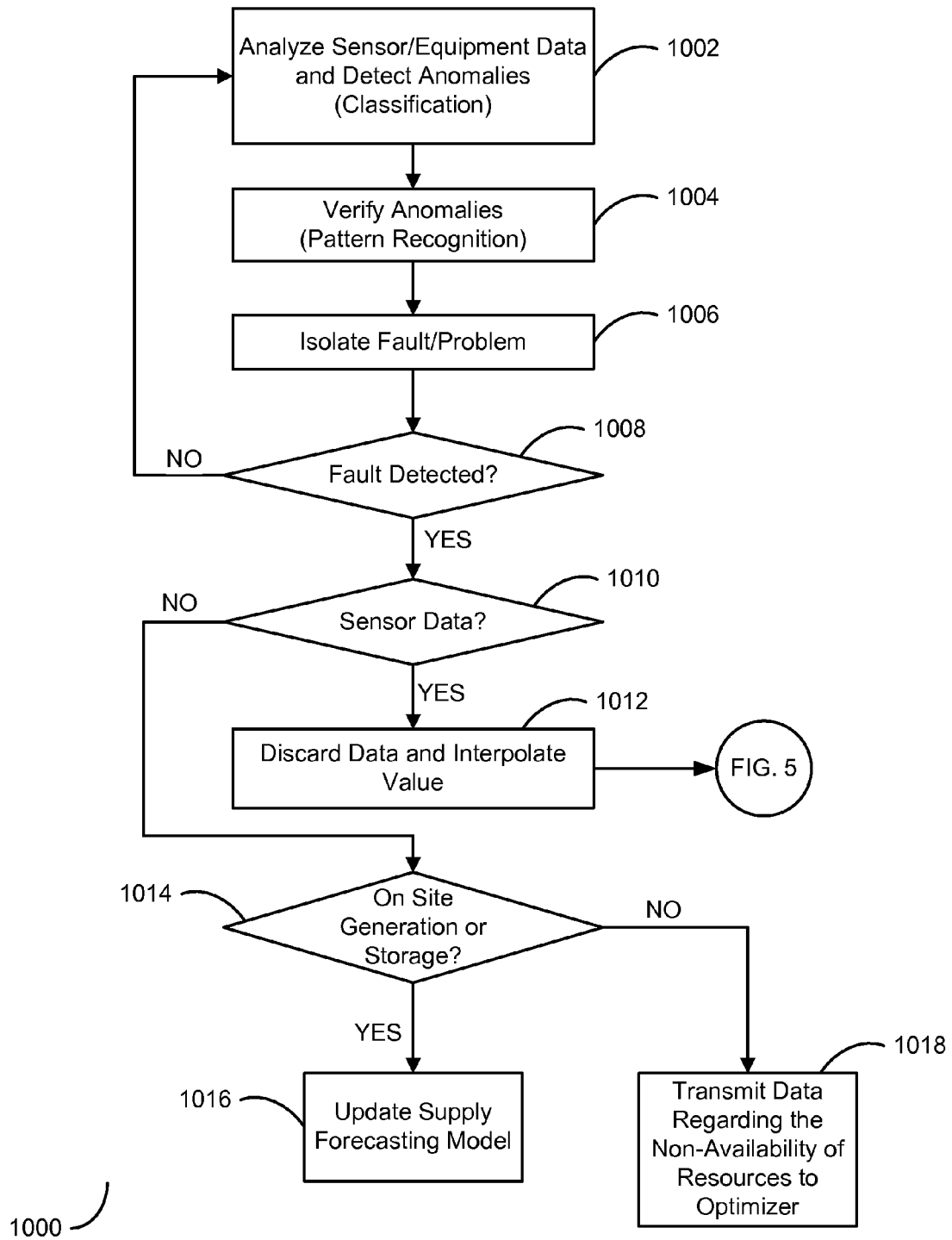
FIG. 10 presents a flow diagram illustrating a method for detecting faults in building control systems according to one embodiment of the present invention.

FIG. 10 presents a flow diagram illustrating a method for detecting faults in building control systems according to one embodiment of the present invention. According to the embodiment that FIG. 10 illustrates, a method 1000 analyzes sensor data and equipment status data and detects anomalies, step 1002. In the illustrated embodiment, detecting anomalies may comprise classifying incoming data points using various classification techniques such as naïve Bayes classification, SVM, or ANN, etc.

The method 1000 then verifies the detected anomalies, step 1004. In the illustrated embodiment, the method 1000 may employ various pattern recognition techniques in order to verify that the identified anomalies are, in fact, anomalous. The method 1000 isolates the fault, step 1006 and determines if a fault was detected, step 1008. If the method 1000 determines that a fault was not detected (e.g., a false positive), the method 1000 continues to monitor sensor data and equipment status data, step 1002.

If the method 1000 determines that a fault was detected, the method 1000 determines if the data was received from a sensor, step 1008. If the method 1000 determines that the data was received from a sensor, the method 1000 may discard the faulty data and interpolate the data to generate a correct reading, step 1012. The method 1000 may then proceed to clean the data, FIG. 5.

If the method 1000 determines that the data is not sensor data, step 1010, the method 1000 may then determine if the data was received from on-site generate or storage subsystems, step 1014. If the data is from on-site generate or storage subsystems, the method 1000 may update the supply forecasting model, step 1016. In the illustrated embodiment, the method 1000 may employs methods for updating a forecasting model as have been discussed previously. If the method 1000 determines that the data is not from on-site generation or storage, the method 1000 may transmit the data regarding the non-availability of resources to the optimizer, step 1018. In the illustrated embodiment, the method 1000 transmits the data regarding the non-availability of resources to the optimizer in order to further optimize the existing optimized demand forecasts and to the building control system to update the availability of the building resource For example, if a given subsystem is unavailable or broken, the method 1000 may alert the optimizer that a given operational plan may not be achievable due to equipment or sensor failure.

Figure 11:
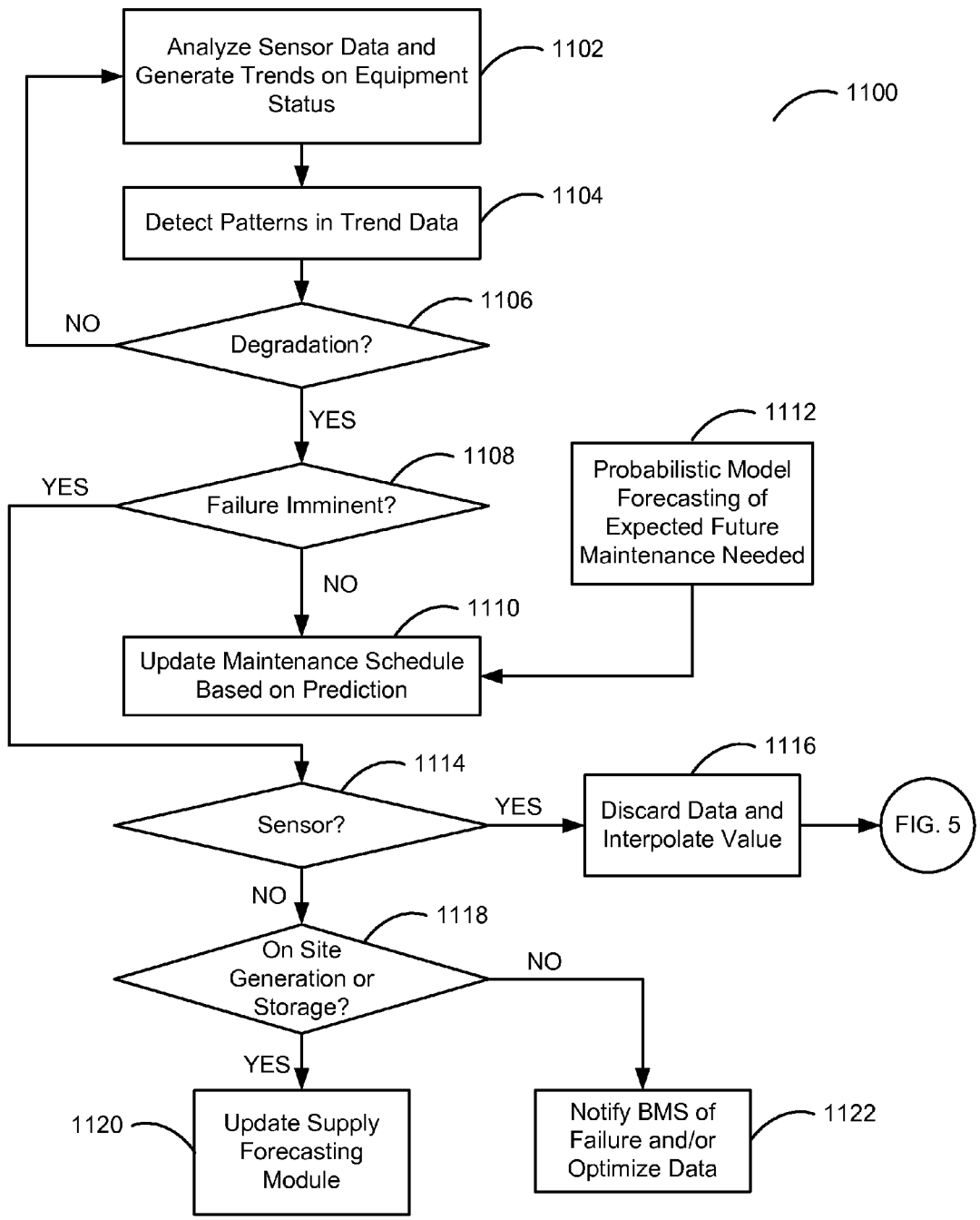
FIG. 11 presents a flow diagram illustrating a method for predicting faults in building control systems according to one embodiment of the present invention.

FIG. 11 presents a flow diagram illustrating a method for predicting faults in building mechanical, electrical and other systems according to one embodiment of the present invention. According to the embodiment FIG. 11 illustrates, a method 1100 analyzes sensor data and equipment status data and generates trends on sensor and equipment status, step 1102. The method 1100 then attempts to detect patterns within the trend data, step 1104. If degradation is not detected, step 1106, the method continues to analyze sensor and equipment status data and generate trends on status of sensors and building equipment, step 1102. In the illustrated embodiment, a trend may be generated for a given interval range (e.g., 1 day, 1 week, etc.). Generating a trend may comprise of monitoring the data value of a give sensor/equipment over the interval. Detecting patterns in the trend data may comprise identifying recurring patterns in an interval range smaller than the trend interval range (e.g., lower lighting usage at night within a 24-hour trending interval). The method 1100 may detect degradation of trend data when the method 110 determines that current data falls below, or rises above, a pre-defined threshold associated with the trend data.

If the method 1100 determines that degradation occurs, the method 1100 next determines whether failure is imminent, step 1108. If failure is not imminent, the method 1100 updates the maintenance schedule based on the prediction, step 1100. In the illustrated embodiment, updating the maintenance schedule based on the prediction utilizes a probabilistic model forecasting of expected future maintenance needed, 1112. In the illustrated embodiment, the probabilistic model forecasting of expected future maintenance needed may be generated using similar techniques as discussed previously. In one embodiment, updating the maintenance schedule based on the prediction may comprise automatically updating an electronic schedule of routine maintenance to indicate the identified potential failure.

If failure is imminent, the method 1100 may transmit an urgent alert to building management (not shown). The method 1100 may then determine if the failure is associated with a sensor, step 1114. If the failure is associated with a sensor, the method 1116 discards the faulty data and may interpolate a new value, step 1116. In the illustrated embodiment, discarding a faulty data value and interpolating may be accomplished by means previously discussed.

If the method 1100 determines that the data is not sensor data, step 1114, the method 1100 may then determine if the data was received from on-site generate or storage subsystems, step 1118. If the data is from on-site generate or storage subsystems, the method 1100 may update the supply forecasting model, step 1120. In the illustrated embodiment, the method 1100 may employs methods for updating a forecasting model as have been discussed previously as well as notify the appropriate building control system. If the method 1100 determines that the failing equipment is not on-site generation or storage, the method 1100 may notify the appropriate building control system and the optimizer (see, e.g., FIG. 8) of the failure, step 1122.

FIGS. 1 through 11 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments so fully reveals the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein.

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method for optimizing building energy usage, the method comprising:
   receiving a data set comprising a plurality of input values associated with one or more buildings, said input values containing at least thermal input values and electrical input values;
   constructing a thermal load model based on at least the thermal input values;
   constructing an electrical model based on at least the electrical input values;
   constructing an overall energy model, the overall energy model being based on an analysis of interactive effects and trade-offs between the thermal model and the electrical models;
   generating a plurality of demand models based on the overall energy model;
   generating an on-site generation model for a power generation source located on-site with the one or more buildings, wherein generating the on-site generation model includes:
      generating a load predictive model for the on-site power generation source based at least on historical on-site power generation data;
      generating a consumption model for the on-site power generation source; and
      discounting the load predictive model by the consumption model to generate the on-site generation model;
   prioritizing a plurality of constraints, strategies and targets, wherein the constraints, strategies and targets comprise constraints, strategies and targets relating to energy management, occupant comfort, energy efficiency, demand response, and energy usage, at least one constraint, strategy or target related to use of the on-site power generation source in the one or more buildings;
   optimizing one or more of the plurality of demand models using complex multivariate optimization techniques, wherein optimizing is based on usage data and the prioritized constraints, strategies, and targets; and
   displaying recommendations based on one or more of the optimized demand models or generating realtime, complementary control instructions based on one or more of the optimized demand models.

2. The method of claim 1 further comprising cleaning the input values prior to constructing a thermal model and electrical model.

3. The method of claim 2 wherein cleaning the input values prior to constructing a thermal model and electrical model comprises detecting abnormal data and invalid inputs.

4. The method of claim 3 wherein cleaning the input values prior to constructing a thermal model and electrical model further comprises interpolating invalid data points and performing principle component analysis of the data set.

5. The method of claim 1, wherein generating the on-site generation model comprises determining whether the on-site power generation source comprises a variable or consistent on-site power generation source.

6. The method of claim 1 wherein the thermal model and electrical models are generated based on built and stored demand models for a plurality of subsystem categories.

7. The method of claim 6 wherein the plurality of subsystem categories includes one or more of heating, cooling, ventilation, lighting, water, plug load, and data center demand models.

8. The method of claim 1 wherein the constraints, strategies and targets further include general rules, the general rules comprising proprietary rules based on research, rules based on comparisons to peer benchmarks and rules derived by comparing research to manufacturer-supplied data.

9. The method of claim 1 wherein optimizing the one or more demand models uses one of: nonlinear programming techniques comprising at least one of genetic algorithms, simulated annealing, and artificial neural networks, and linear approximations to a nonlinear problem comprising at least one of Taylor series expansions and artificial neural networks.

10. The method of claim 1 wherein constructing thermal and electrical models comprises using one of memory-based time-series regression analysis using at least one of ARIMA, ANN, and SVM techniques.

11. The method of claim 1 further comprising simulating building systems based on the energy model, comparing simulation outcomes, and generating recommendations based on the comparison.

12. The method of claim 1, wherein generating the on-site generation model comprises generating an on-site generation model for a renewable energy source located on-site with the one or more buildings, and wherein generating the load predictive model for the on-site renewable energy source is based on historical on-site renewable energy data and weather data related to such renewable energy source.

13. A system for optimizing building energy usage, the system comprising:

a plurality of data sources stored on one or more data stores containing a plurality of input values associated with one or more buildings, said input values containing at least thermal input values and electrical input values;

a forecasting and estimation engine operative to:

construct a thermal and an electrical load model based on at least the thermal input values;

construct an electrical model based on at least the electrical input values;

construct an overall energy model, the overall energy model being based on an analysis of interactive effects and trade-offs between the thermal model and the electrical models;

generate a plurality of demand models based on an the overall energy model;

generate an on-site generation model for a power generation source located on-site with the one or more buildings, wherein the forecasting and estimation engine:

generates a load predictive model for the on-site power generation source based at least on historical on-site power generation data;

generates a consumption model for the on-site power generation source; and discounts the load predictive model by the consumption model to generate the on-site generation model;

prioritize a plurality of constraints, strategies, and targets, wherein the constraints, strategies, and targets comprise constraints, strategies, and target relating to energy management, occupant comfort, energy efficiency, demand response, and energy usage at least one constraint, strategy or target relating to use of the on-site power generation source in the one or more buildings; generate a plurality of demand models based on the constructed energy model;

an optimization engine operative to optimize one or more of the plurality of demand models using complex multivariate optimization techniques, wherein optimizing is based on usage data and the prioritized constraints, strategies, and targets;

a graphical user interface operating on a client device operative to display recommendations based on one or more of the optimized demand models or an interface to building control systems operative to transmit complementary control instructions based on one or more of the optimized demand models.

14. The system of claim 13 further comprising a data conditioner operative to clean the input values prior to constructing a thermal model and electrical model.

15. The system of claim 14 wherein the data conditioner is operative to detect abnormal data and invalid inputs.

16. The system of claim 15 wherein the data conditioner is further operative to interpolate invalid data points and perform principle component analysis of the data set.

17. The system of claim 13 wherein the forecasting and estimation engine is further operative to determine whether the on-site power generation source is a variable or consistent on-site power generation source.

18. The system of claim 13 wherein the forecasting and estimation engine constructs the thermal model and electrical models based on built and stored demand models for a plurality of subsystem categories.

19. The system of claim 18 wherein the plurality of subsystem categories includes heating, cooling, ventilation, lighting, water, plug load, and data center demand models.

20. The system of claim 13 wherein the constraints, strategies and targets further include general rules, the general rules comprising proprietary rules based on research, rules based on comparisons to peer benchmarks and rules derived by comparing research to manufacturer-supplied data.

21. A method for optimizing building energy usage, the method comprising:

receiving a plurality of input values associated with one or more buildings, said input values containing at least thermal input values and electrical input values;

constructing a thermal model based on at least the thermal input values;

constructing an electrical model based on at least the electrical input values;

constructing an overall energy model, the overall energy model being based on the thermal model and the electrical models;

generating a plurality of demand models;

generating an on-site generation model for a power generation source located on-site with the one or more buildings, wherein generating the on-site generation model includes:

generating a load predictive model for the on-site power generation source based at least on historical on-site power generation data;

generating a consumption model for the on-site power generation source; and discounting the load predictive model by the consumption model to generate the on-site generation model;

prioritizing a plurality of constraints, strategies, and targets, wherein the constraints, strategies, and targets comprise constraints, strategies, and targets relating to energy management, occupant comfort, energy efficiency, demand response, and energy usage, at least one constraint, strategy or target relating to use of the on-site power generation source in the one or more buildings;

optimizing one or more of the plurality of demand models using complex multivariate optimization techniques, wherein optimizing is based on usage data and the prioritized constraints, strategies, and targets; and displaying recommendations based on one or more of the optimized models or generating realtime, complementary control instructions based on one or more of the optimized models, the determination of displaying recommendations or generating realtime, complementary control instructions based on client preferences.

* * * * *